(12) United States Patent
Robertson et al.

(10) Patent No.: US 7,316,321 B2
(45) Date of Patent: Jan. 8, 2008

(54) SIFTING SCREEN

(75) Inventors: Graham Robertson, Edinburgh (GB); Caspar Hassall, Kuala Lumpur (MY)

(73) Assignee: United Wire Limited, Edinburgh (GB)

( * ) Notice: Subject to any disclaimer, the term of this patent is extended or adjusted under 35 U.S.C. 154(b) by 54 days.

(21) Appl. No.: 10/493,750

(22) PCT Filed: Nov. 5, 2002

(86) PCT No.: PCT/GB02/05018

§ 371 (c)(1),
(2), (4) Date: Apr. 23, 2004

(87) PCT Pub. No.: WO03/041878

PCT Pub. Date: May 22, 2003

(65) Prior Publication Data

US 2005/0150821 A1     Jul. 14, 2005

(30) Foreign Application Priority Data

Nov. 10, 2001   (GB) ................................. 0127085.9

(51) Int. Cl.
*B07B 1/46* (2006.01)
(52) U.S. Cl. ...................................... 209/400; 209/403
(58) Field of Classification Search ........ 209/400–403, 209/931
See application file for complete search history.

(56) References Cited

U.S. PATENT DOCUMENTS

| | | | | |
|---|---|---|---|---|
| 2,723,032 A * | 11/1955 | Jelks et al. | ................. | 209/401 |
| 4,120,785 A * | 10/1978 | Kanamori et al. | .......... | 209/401 |
| 4,575,421 A * | 3/1986 | Derrick et al. | .............. | 209/397 |
| 5,417,859 A * | 5/1995 | Bakula | ....................... | 210/388 |
| 5,851,393 A * | 12/1998 | Carr et al. | ................... | 210/489 |
| 5,944,197 A * | 8/1999 | Baltzer et al. | ............. | 209/400 |
| 5,950,841 A * | 9/1999 | Knox et al. | ................. | 209/315 |
| 6,202,857 B1 * | 3/2001 | Keller et al. | ................ | 209/404 |
| 6,932,883 B2 * | 8/2005 | Adams et al. | ............. | 156/320 |

FOREIGN PATENT DOCUMENTS

GB        2322590 A  *  9/1998

* cited by examiner

*Primary Examiner*—Joseph Rodriguez
(74) *Attorney, Agent, or Firm*—Barnes & Thornburg LLP

(57) ABSTRACT

A screen for use in a vibratory machine for separating particulate material from liquid material comprising a rigid rectangular support frame having flanges along all four edges to which screen cloths of the type described are bonded with the longer dimension of the rectangular openings defined by the warp and weft wires of the cloth parallel to the longer dimension of the frame. The frame includes an array orthogonal rigid interstices defining a plurality of similar sized rectangular openings or window and the cloths are also bonded to the interstices for the purpose of maintaining the length to width ratio of the openings in the cloths defined by the warp and weft wires thereof. The warp and weft wires of the cloths are tensioned before being bonded to the flanges and interstices.

4 Claims, 19 Drawing Sheets

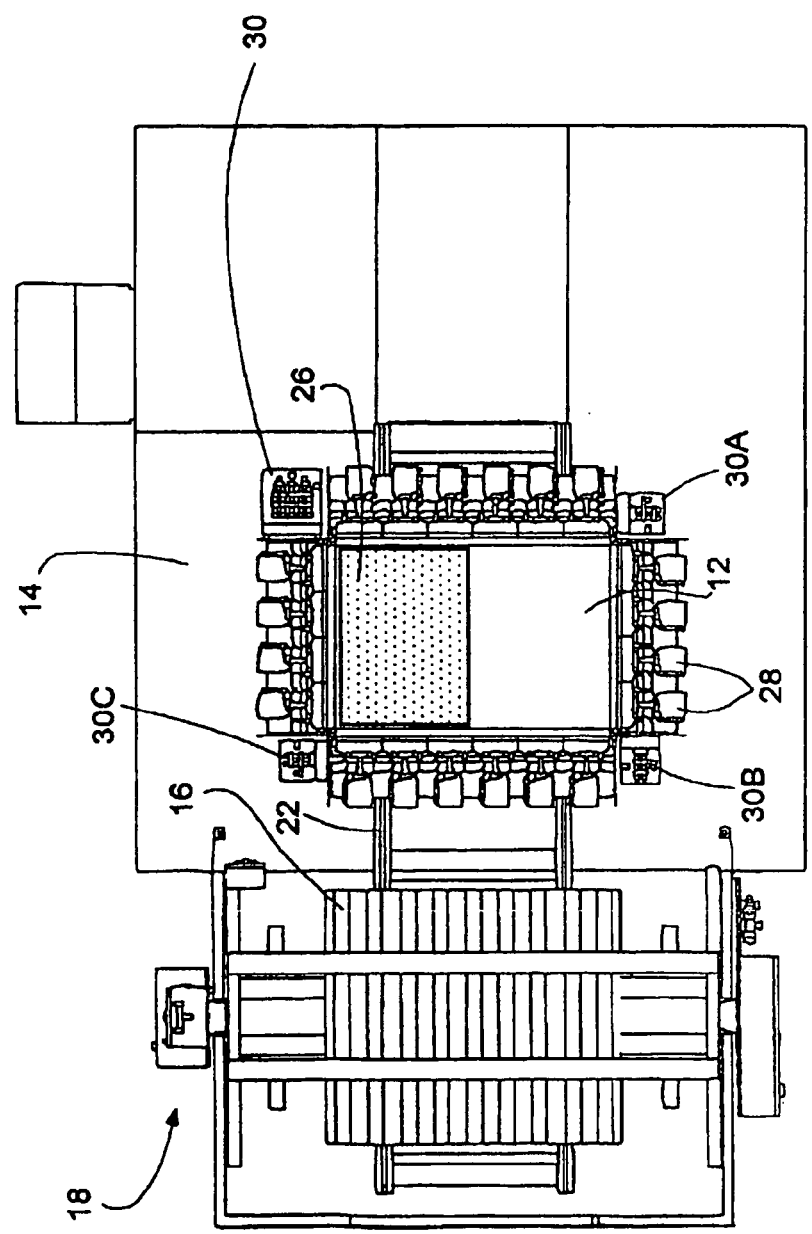

P1 - Vacuum / Clamp Pressure (5.5 Bar)
L1 - Tension Pressure Layer 1 (4.0 Bar)
L2 - Tension Pressure Layer 2 (3.0 Bar)
L3 - Tension Pressure Layer 3 (2.0 Bar)

SIFTING SCREEN

FIELD OF INVENTION

This invention concerns screens such as are fitted to vibrating screening machines, sometimes known as shale shakers used to separate solids from fluids. Such machines are of particular application in the oil well drilling industry to separate drilling mud from base fluid after recovery from down-hole during drilling.

BACKGROUND TO THE INVENTION

U.S. Pat. No. 5,944,197 describes woven wire screencloth having a plurality of parallel warp filaments intersected by a plurality of parallel weft filaments configured with a greater number of warp filaments than weft filaments per given area so as to form rectangular openings in the weave. Each opening therefore has a length and width dimension and cloth having such rectangular openings has been found to possess certain desirable properties in relation to the filtering of certain muds.

According to U.S. Pat. No. 5,944,197 the length to the width ratio of each rectangular opening is optimally in the range 2.7 to 2.8 and an optimal ratio of the length of each opening to the diameter of the weft filaments has been found to lie in the range 5.5 to 5.7. This US Patent also teaches that in order to take advantage of the rectangular openings in the mesh, the interstices must be locked to prevent the warp and weft wires from slipping during operation. Therefore by calendering the wire cloth between a set of rollers, the filaments are compressed at the intersections of the warp and weft and this assists to resist movement between the warp and weft filaments. Combining optimal wire diameter ratio and calendering, permitted an increased length to width ratio to be employed in the cloth.

Ideally screen conductance is optimised and in general this occurs when wire diameters for the warp and weft filaments are as small as is practical. However the desire for increased conductance can have a negative impact on the quality of the screen and its effectiveness and using smaller diameter warp and weft filaments can result in the warp and weft not remaining perpendicular. Furthermore reducing wire diameter can reduce useful screen life due to wear and tear and breakage of the small diameter wires. The mesh provided by the teaching of U.S. Pat. No. 5,944,197 has been shown to have a greater conductance and improved life over prior art meshes when used to make similar screens, since by employing slightly larger diameter wires but omitting some of the weft wires, so as to produce rectangular openings in the mesh, there is a trade-off and the reduced conductance is offset by the increased screen life relative to prior art mesh constructions.

Correct calendering of the cloth assists in preserving the orthogonality of the warp and weft filaments and maintaining the high ratio of length to width in each of the rectangular openings in the weave. However insufficient calendering pressure fails to lock the warp and weft wires so that the orthogonality is compromised and the desirable opening ratios altered. Too much calendering pressure excessively deforms the wires resulting in shortened operational life. Consequently manufacture of the cloth described in U.S. Pat. No. 5,944,197 has to be the subject of tight tolerances and close control. Even correctly calendering the wire cloth deforms the warp and weft filaments which when other screen life-shortening conditions are present can result in earlier failure than otherwise might be the case.

The present invention seeks to provide a woven wire cloth screen in which the openings between warp and weft filaments are rectangular and the length to width ratios are maintained, thereby retaining the good conductance characteristics of such a cloth, but which does not require the cloth to be calendered.

Since the invention involves the use of wire cloth which is woven in accordance with the techniques described in U.S. Pat. No. 5,944,197 (albeit without being calendered), references to such cloth will be referred to as cloth of the type described. It is to be understood however that the reference to such cloth is to a wirecloth which has been produced without the step of calendering the cloth after weaving, and is a reference to the choice of warp and weft material, sizes, length to width ratios of the openings in the cloth, and opening length to weft filament diameter ratios.

SUMMARY OF THE INVENTION

According to the present invention there is provided a screen for use in a vibrating machine for separating particulate material from liquid material, comprising a rigid rectangular support frame having flanges along all four edges to which screen cloth of the type described is bonded, and within the frame, an array of orthogonal rigid interstices defining a plurality of similar sized rectangular openings below the cloth stretched across so as to be tensioned and bonded to the frame, the cloth also being bonded to the edges of the interstices over which the cloth is stretched to maintain both the tension in the wire and the length to width ratio of the openings in the mesh defined by the warp and weft wires of the wirecloth.

Two (or more) such cloths of the type described may be stretched over the frame and bonded to the boundary flanges and interstices within the frame, so as to form a two (or more) cloth layer screen.

The mesh size of one of the cloths may be different from that of the other and typically a coarser mesh cloth is laid over the frame first, and a cloth having a smaller mesh size is laid over the coarser mesh cloth, and the two cloths are bonded to the flanges and interstices of the frame.

In manufacture, one cloth may be laid over and secured first and any additional cloth or cloths subsequently laid over and bonded in turn.

Alternatively and more preferably however, the two or more cloths which are to be bonded to the frame are laid over the frame simultaneously with the coarser mesh cloth below the finer mesh cloth or cloths, and the cloths are gripped and pulled in tension so that differential tension exists in the cloths at least due to different diameters of the wires forming the cloths, and while the tension is maintained in the cloths, heat and pressure is applied so as to bond the cloths to the edge flanges of the frame and to the interstices within the frame, and the tension generating pulling forces are only removed after the bonding has been completed, so that the tension remains in the warps and wefts of the cloths, and the length to width ratios of the openings in the mesh of the cloths is preserved by the bonding of the cloths to the interstices and flanges of the frame.

The invention therefore also provides a method of making a screen for use in a vibratory machine for separating particulate material from liquid material comprising the steps of laying screen cloths of the type described over a rigid rectangular support frame having flanges along all four edges and an array of orthogonal rigid interstices defining a plurality of similar sized rectangular openings within the area defined by the four flanges, arranging the cloths so that the longer dimensions of the rectangular openings in the cloths are parallel to the longer length of the rectangular frame, tensioning the cloths in both warp and weft directions, bonding the tensioned cloths to the flanges to secure the cloths to the frame and maintain the tension in the areas of the cloths bounded by the four flanges after forces creating the tensions in the cloths are removed, and bonding the cloths to the interstices to maintain the relative positions of the warp and weft wires in the cloths between the interstices, and thereby maintain the length to width ratio of the openings in the cloths defined by the interwoven warp and weft wires thereof.

The tension imparted to the cloth in contact with the frame is preferably different from that in the cloth which overlays it. Likewise the mesh size of the lower cloth may be coarser than that of the overlying cloth(s).

Where a thermoplastics material is employed to make the bond, this entails heating the plastics material at least in the region of the edge or surface of the frame part to which the cloth or cloths are to be bonded and thereafter allowing the plastics material to cool to hold the cloth or cloths in position.

Whilst the cloths of the type described may be secured to a metal framework defining the edge flanges and orthogonal interstices, in which the metal is coated liberally with a suitable plastics material which upon being heated will accept the cloth and on cooling will bond the cloths to the framework, the invention is of particular application to a so-called composite frame in which at least the four outside members and the interstices are formed from an array of metal wires and/or rods encapsulated within a plastics material, preferably a glass reinforced resin material, such as is described in UK Patents 2322590 and 2337019.

The invention thus provides a screen for use in a vibratory machine for separating particulate material from liquid material comprising a rigid rectangular support frame having flanges along all four edges to which screen cloths of the type described are bonded with the longer dimension of the rectangular openings defined by the warp and weft wires of the cloth parallel to the longer dimension of the frame, and wherein the frame includes within the four flanges an array of orthogonal rigid interstices defining a plurality of similar sized rectangular openings or windows and the cloths are also bonded to the interstices for the purpose of maintaining the length to width ratio of the openings in the cloths defined by the warp and weft wires thereof, and wherein the warp and weft wires of the cloths are tensioned before being bonded to the flanges and interstices.

Preferably before a first coarse mesh cloth is bonded to the frame two further woven wirecloths are laid over on top of the other cloth and all the wirecloths are individually tensioned and thereafter bonded to the flanges and the interstices under pressure in a single step, the mesh size of the two further cloths being smaller than that of the first cloth, and differing slightly as between one and the other of the two further cloths It has been discovered that by tensioning cloths of the type described across a frame to which they are to be bonded peripherally and along the lines of the interstices of the matrix of struts defining the large number of rectangular openings within the frame, the calendering step can be omitted without compromising the orthogonal integrity of the warp and weft wires. A consequent advantage is that in the absence of calendering there is less chance of deformation and weakening of the cloth interstices, the screen cloth life is considerably increased, and the manufacture of the cloth is simplified.

By eliminating the calendering step, not only is a processing stage omitted in the production of a screen which requires significant controls to be in place, but so is the attendant cost and delay. The resulting screen therefore possess an economic production advantage as well as longer life of the cloth meshes stretched thereacross, since the knuckles of the cloth have not been subjected to a calendering step which even when correctly performed can work hard and weaken the warp and weft filaments.

The present invention represents a surprising departure from the invention claimed in U.S. Pat. No. 5,944,197, since the applicants have discovered that the calendering step can be omitted without loss of orthogonal integrity of the warp and weft wires in the cloth, if the cloth is bonded to a frame of the type described, in the manner disclosed herein.

In particular the applicants have discovered that by using an uncalendered cloth otherwise woven in accordance with U.S. Pat. No. 5,944,197, and bonding the cloth to a GRP frame containing internal steel reinforcements as described and claimed in the aforementioned UK Patent specifications, the cloth interstices become locked as if the cloth were calendered. The resulting screen has the lightweight but high strength and rigidity properties of screens associated with the frame construction described in the aforementioned UK Patent specifications, but with the enhanced conductance associated with cloths woven in accordance with U.S. Pat. No. 5,944,197, and an increased screen life as compared to screens employing calendered cloth.

The invention will now be described by way of example with reference to the accompanying drawings in which:

FIG. 1 illustrates to an enlarged scale part of a cloth woven in accordance with U.S. Pat. No. 5,944,197 before the calendering step;

FIG. 2 illustrates the cloth after the calendering step proposed by U.S. Pat. No. 5,944,197 and which is omitted when making the cloth for use in the screen proposed by the present invention;

FIGS. 8-12 are side views of a complete apparatus containing a cradle on which the jig is mounted, for moving the latter between a tensioning station and a bonding station and back again to allow the finished screens to be removed;

Figure 1:
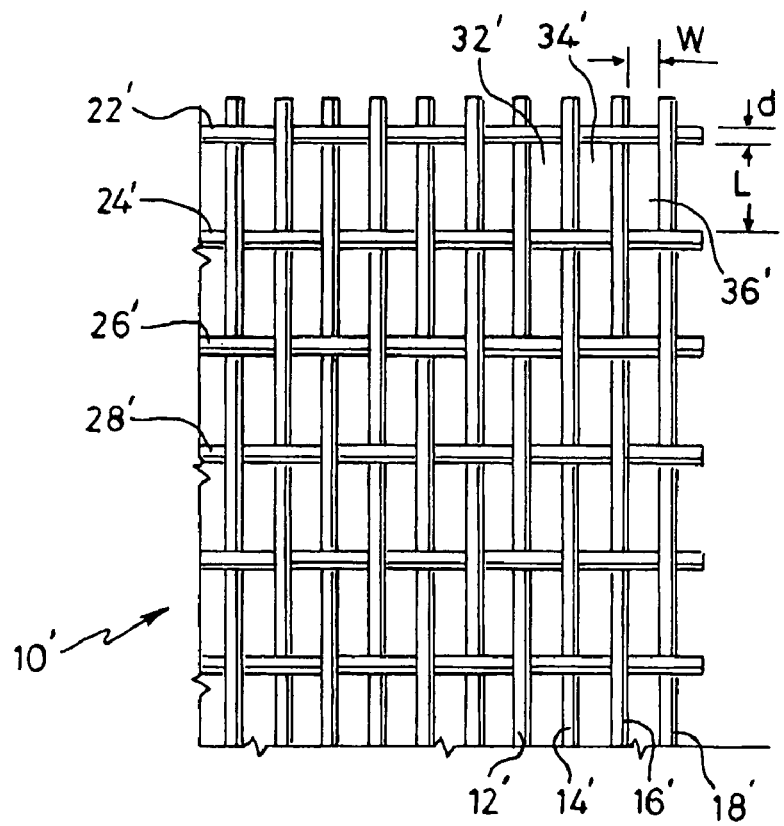
Figure 2:
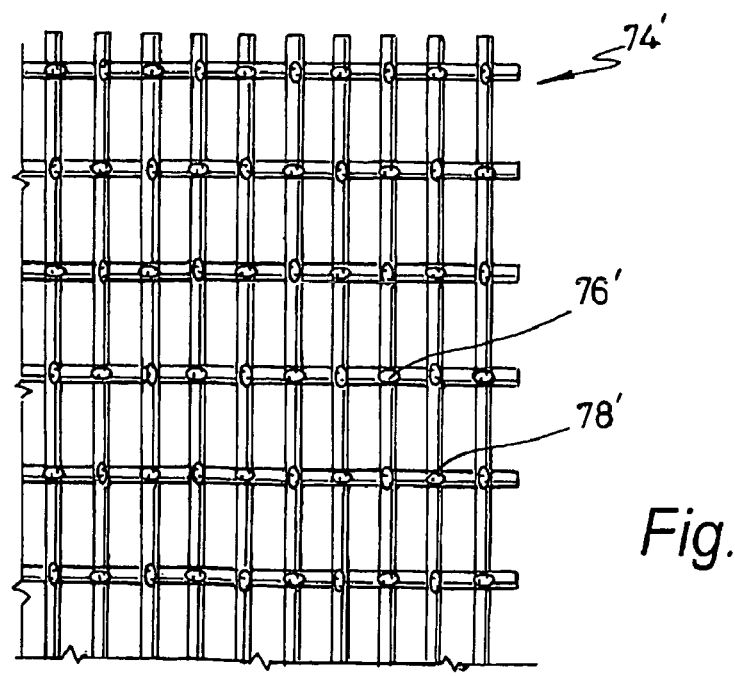
Figure 6:
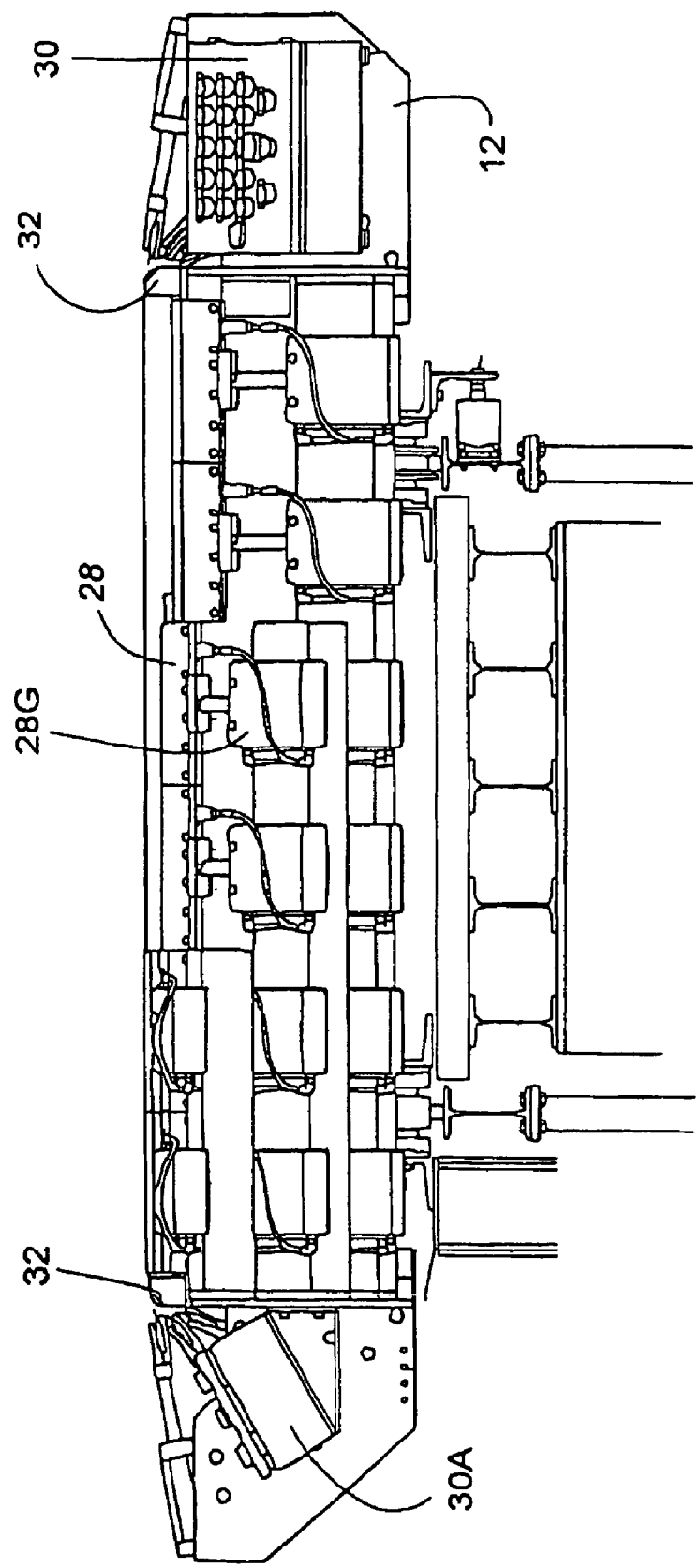
FIG. 6 is an enlarged end view of the clamping and tensioning mechanism of the jig of FIG. 4.
Figure 7:
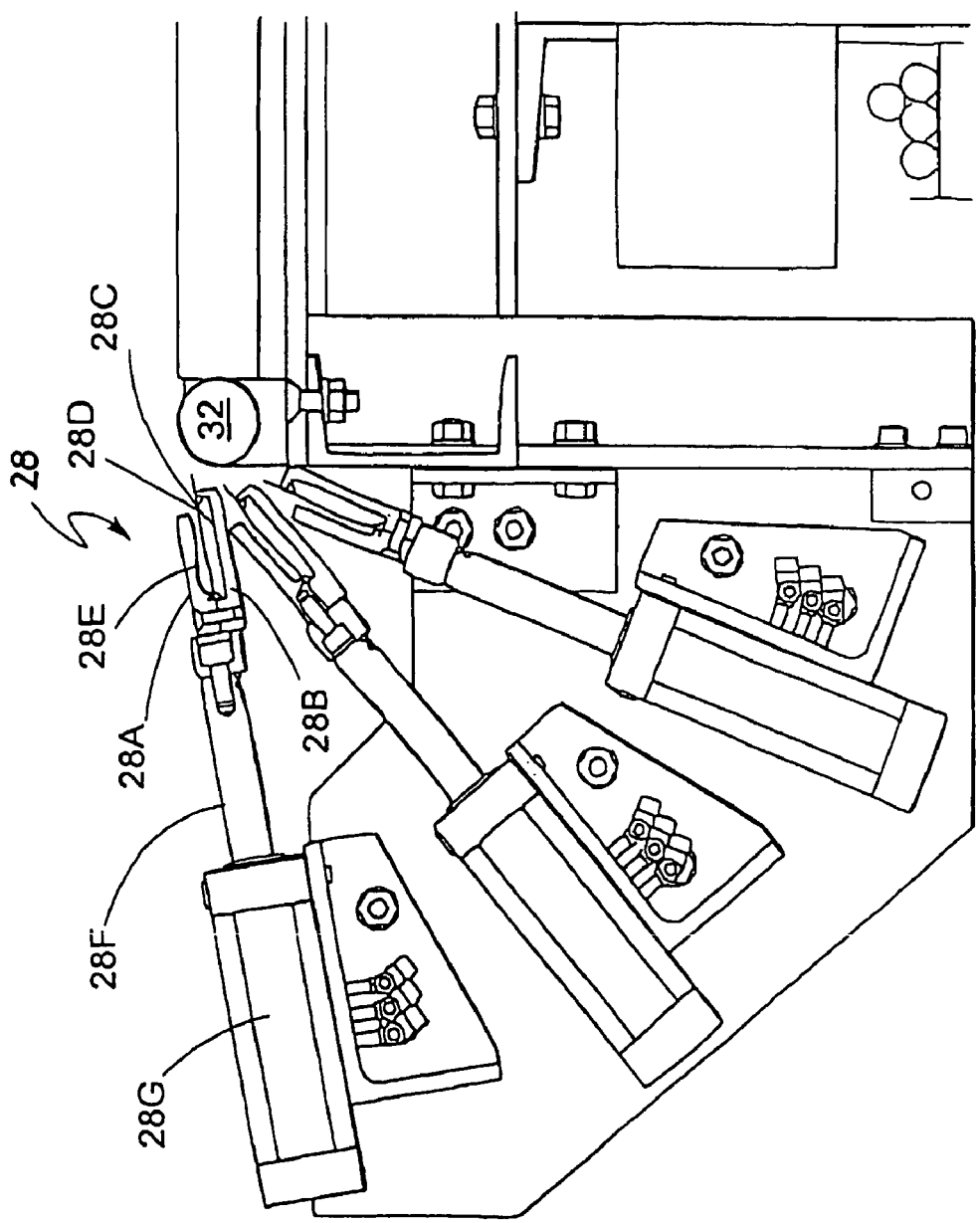
FIG. 7 is a view of the front of the jig of FIG. 4.
Figure 8:
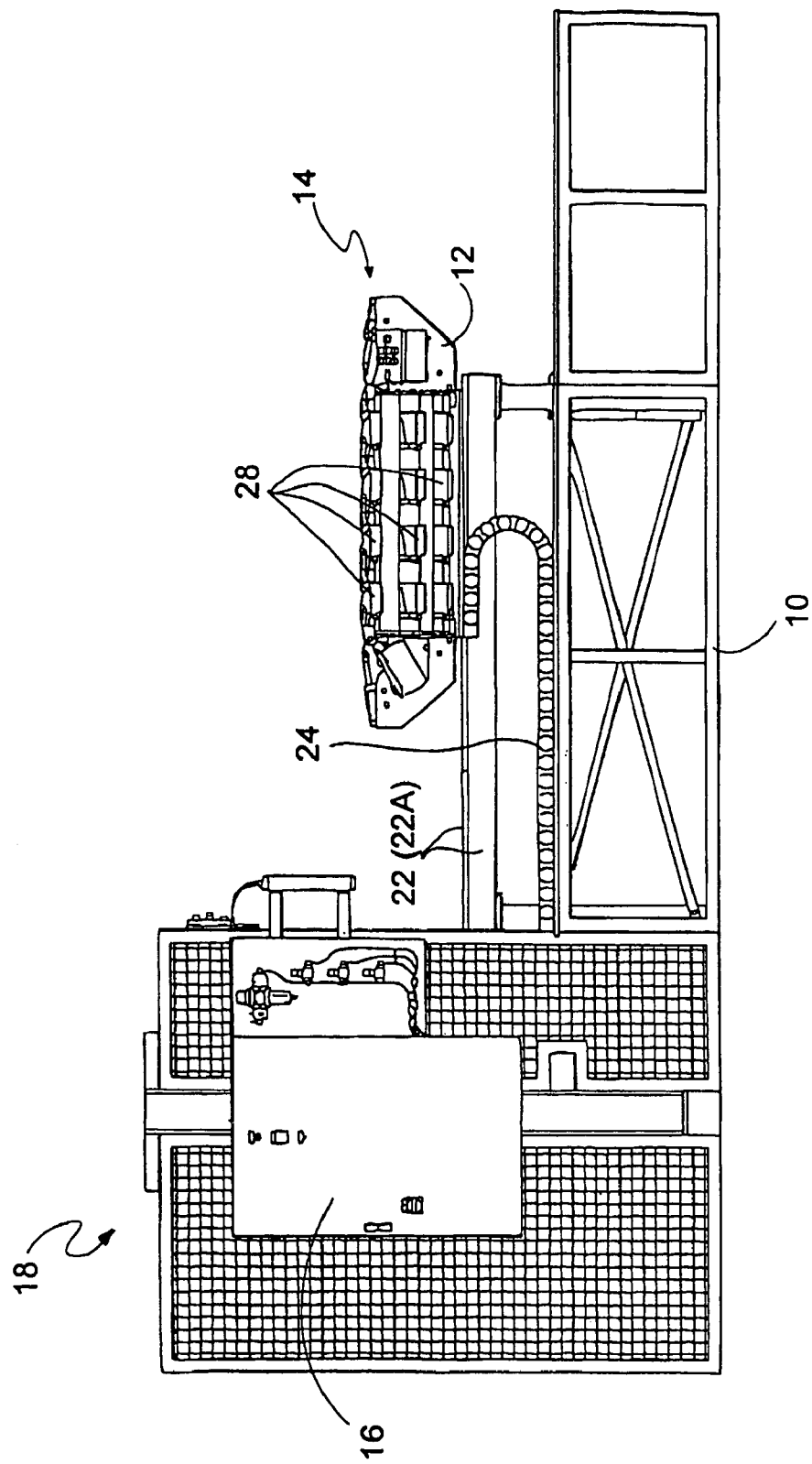

FIGS. 1 and 2 correspond to FIGS. 2 and 6 of U.S. Pat. No. 5,944,197, and FIG. 1 illustrates an enlarged view of part of a piece of wirecloth which is to form a screen which includes a plurality of parallel warp wires, such as at 12', 14', 16' and 18' which are crossed by and interwoven with a plurality of parallel weft wires such as at 22', 24', 26' and 28' at their intersections. FIG. 1 shows the rectangular openings between the warp and weft wires which are maintained in the untensioned cloth making up the screen described in U.S. Pat. No. 5,944,197 by calendering the wirecloth after weaving and before it is secured to a support as described elsewhere in U.S. Pat. No. 5,944,197.

It can be seen that there are a greater number of warp wires 12', 14', 16' and 18' than weft wires 22', 24', 26' and 28' per unit or given area. The woven warp and weft wires form a plurality of intersections which, in turn, form rectangular openings, such as openings 32' 34' and 36'. The rectangular openings have a length dimension L and a width dimension W.

By employing rectangular openings 32', 34' and 36' a greater open area is obtained than with square openings. At the same time, the screen warp wires 12', 14' 16' and 18' effectively block or screen solid particles having a diameter larger than the space between the warp filaments 12', 14', 16' and 18'.

The length of the rectangular openings L to the width of the rectangular openings W may be expressed as a ratio. The length to width ratio which is optimal for each opening has been found to be between approximately 2.7 to 2.8.

In accordance with U.S. Pat. No. 5,944,197 the method of making the screen involves calendering the top or uppermost screen cloth between a set of rollers. Calendering the screen cloth compresses the cloth at the warp and weft intersections. This serves to discourage movement between the warp and weft wires and assist in locking the intersections of the warp and weft wires in place.

FIG. 2 shows a top view of a screen cloth 74' after completion of the calendering process. The intersections, or knuckles, such as 76' and 78' are flattened by the rollers. Additionally, although not visible, where the warp and weft wires intersect and touch each other, the wires indent or conform slightly to each other.

It has also been determined that the length of each opening to the diameter of the weft wires may be expressed as a ratio. The optimal ration of the length of each opening to the diameter of the wires is a ratio of between approximately 5.5 to 5.7.

In particular FIG. 2 shows how the calendering step flattens and, with the indentation on the crossing surfaces, weakens the wires where one crosses another at points of intersection, which is avoided by the present invention, FIG. 1 illustrates the relationship of the length of the openings L to the diameter of the weft wires d. The relationship may be expressed as follows:

$L/d=5.5-5.7$

Where "L" is the length of the opening and "d" is the diameter of the weft wires. The length of the opening "L" is the actual opening and not the distance between centre of one weft wire to the centre of an adjoining weft wire.

The following Figures in the drawings illustrate a method of manufacturing a filter screen according to the invention and apparatus for manufacturing such a screen. The filter screen can be used as a filter in vibrating filtration equipment such as shakers which are used in the oil drilling industry for separating solids from the liquid phase of oil and water based muds retrieved from drilling operations. Such a screen is described in Patent Specification No WO95/23655. This screen has upper and lower wire mesh cloths of differing qualities stretched over a metal rod reinforced frame of plastics material to which the cloths, after tensioning, are bonded by adhesive. Later Patent Specification No. WO98/37988 describes a frame to which the tensioned cloths can be bonded by heat softening the surface of the frame and pressing relevant parts of the cloths into the softened plastics material, the bond being completed by then allowing the plastics material to cool and cure.

The method and apparatus described herein provides a method of manufacturing a filtering screen according to which a frame of plastics coated metal or reinforced plastics material is located in a jig, at least one wire cloth is placed over the frame and its edges are gripped by pneumatically operated clamps carried by the jig, the clamps are pneumatically driven outwardly of the frame to tension the cloth in orthogonal directions, the tensioned cloth is pressed against the frame by a heated platen in order to bond the cloth to the frame and after completion of the bonding step the clamps are released, the frame is removed from the jig and where necessary the cloth trimmed back to the edges of the frame.

The apparatus comprises a jig for locating at least one such frame of plastics coated metal or reinforced plastics material, pneumatically operated clamps carried by the jig for gripping the edges of a metal wire cloth placed over the at least one frame, pneumatically driven tensioning means on the jig for driving the clamps outwardly from the frame to tension the cloth in orthogonal directions, a platen, means for heating the platen, means for driving the heated platen and/or the jig to press the cloth against the frame in order to locally melt the plastics material and allow the cloth to become embedded therein, and then to retract the platen and/or jig to allow the at least one frame and cloth to cool in order to bond the cloth to the frame, and to allow the frame then to be removed from the jig after release of the clamps.

Two or three layers of wire mesh cloth can be bonded to the frame.

Typically a lower cloth of coarser mesh is located below at least one finer mesh cloth, and preferably two finer mesh cloths having slightly differing mesh sizes are laid over the coarser mesh cloth, and all three are bonded to the frame.

The plastics material of the frame is typically polypropylene.

The frame itself has a rectangular periphery with a lattice of orthogonal intersecting bars. During the heating step, the plastics material forming the upper surface of the frame is softened and the tensioned cloths are pressed into the softened plastics material and become embedded therein. The bond is completed by allowing the frame to cool and the plastics material to cure. It is possible for the upper surface of the frame to be ridged to aid the bonding step, in that it is then only necessary for the heated platen used to press the cloths against the frame, to soften the ridges which then accept the wire mesh to form the bond.

It is most desirable to protect the cloth(s) from direct contact with the heated platen, and for this purpose a heat resistant non-stick fabric, such as PTFE glass fabric, is preferably laid over the cloths prior to the bonding step. The fabric is removed on completion of the bonding step.

When two or more wire cloths are to be incorporated into the screen, a separate set of pneumatically operated clamps is provided for each cloth. Similarly, a cloth tensioning mechanism is provided for the clamps along at least two adjacent sides, and preferably all four sides, of each cloth. The cloths can thus be individually and differentially tensioned as appropriate for the use to which the screen is to be put, prior to being collectively bonded to the frame.

Each clamp comprises a fixed pair of jaws and an inflatable envelope between them for use in gripping the edge of the wire cloth. A thin aluminium plate separates the envelope from the cloth. When inflated, the envelope presses the aluminium plate towards one of the jaws, which is preferably lined with a rubber (or like material) strip, typically 3 cm wide, to improve the grip on the edge of the cloth sandwiched between the plate and the jaw.

A control panel is provided to enable a jig operator to activate the pneumatic clamps and the pneumatic tensioning means. Preferably four control panels are provided, so that the operator can feed the cloth into the clamps along one side of the frame and activate these clamps to clamp that edge of the cloth using one control panel, before moving to another side of the fame and repeating the procedure for that side of the frame, and so on. Where there are two or more levels of clamps and tensioning mechanisms, one level for each layer of cloth, the first cloth is individually clamped and tensioned on all four sides, and then the next, in a similar manner until all the cloths have been clamped and tensioned as appropriate.

The clamping and tensioning of the cloths is performed at a first station remote from a second station at which the bonding occurs. Pneumatic power for the clamps and tensioning mechanisms is therefore supplied to the jig through a flexible supply cable, in order to allow for the movement of the jig between the stations.

Initially, therefore, the at least one frame is loaded into a jig carried by a cradle which, after the cloths have been clamped and tensioned, is conveyed to the second station containing the heated platen.

The cradle preferably has wheels running on rails along which the cradle is driven between the first and second stations by a linear drive, conveniently a Festo® linear pneumatic drive.

The platen is preferably pre-heated and when in position, the jig cradle is raised up to the platen by a hydraulic ram, to commence the bonding step. Thus, the ram may act against the underside of the cradle to lift it off the rails on which the cradle is driven between the first and second stations.

Where a non-stick fabric is to be placed on top of the cloth before it is engaged with the heated platen, the fabric may be placed on the cloth at the first or second station, or in transit.

The platen is typically pre-heated to a temperature in the range 200 to 300 degrees C., preferably about 250 degrees C.

The hydraulic pressure to the ram is adjustable in the range 500 to 2000 psi. to suit the screen materials, and in particular the cloth or cloth combinations used.

The hydraulic pressure to effect the squeeze and heating and bonding step is typically applied for a period of time in the range 30 seconds to 2 minutes.

At the end of the heating and bonding step, the jig cradle and platen are separated to allow the material to cool and cure, and finally the jig cradle is conveyed back from the second station to the clamping and tensioning station, to allow the operator to release the clamps, remove the protective fabric, remove the frame or frames from the jig cradle, and trim the cloths extending beyond the edges of the frame(s).

In order to speed up manufacture two frames are covered at a time, arranged side-by-side, and large area pieces of wire cloth, one for each layer, are stretched over both frames. After the bonding step the large area(s) of cloth are cut along a line between the two side-by-side frames. It will be appreciated that the jig cradle is thus relatively large, but the time taken to fit, clamp and tension each large sheet is little different from what would be required to similarly handle smaller areas of cloth over a single frame, and each heating and bonding step results in two screens instead of just one.

The clamps of any one layer are preferably movable outwardly of the frame individually and independently of each other, i.e. each clamp has a spearate associated tensioning mechanism, so that any localised slack in the cloth can be taken up.

A breaker bar may be located immediately in front of each line of clamps each of the sides of the frame, and the cloth(s) move over it as the cloth(s) are tensioned, thereby to remove any ripples in the cloth.

Referring to FIGS. 3 to 13, the illustrated apparatus comprises a supporting framework 10 which at one end supports a cradle 12 forming a jig for enabling assembly of screen frames at an assembly station 14, and which at the other end is integrated with a heating platen support unit 16 constituting a bonding station 18. The cradle 12 has wheels which run on parallel spaced apart rails 22, 22A to enable the cradle to be moved between the two stations by a drive 23. (see FIG. 10). At least one rail and the wheels corresponding therewith are designed to ensure that the cradle moves in a straight path.

Figure 10:
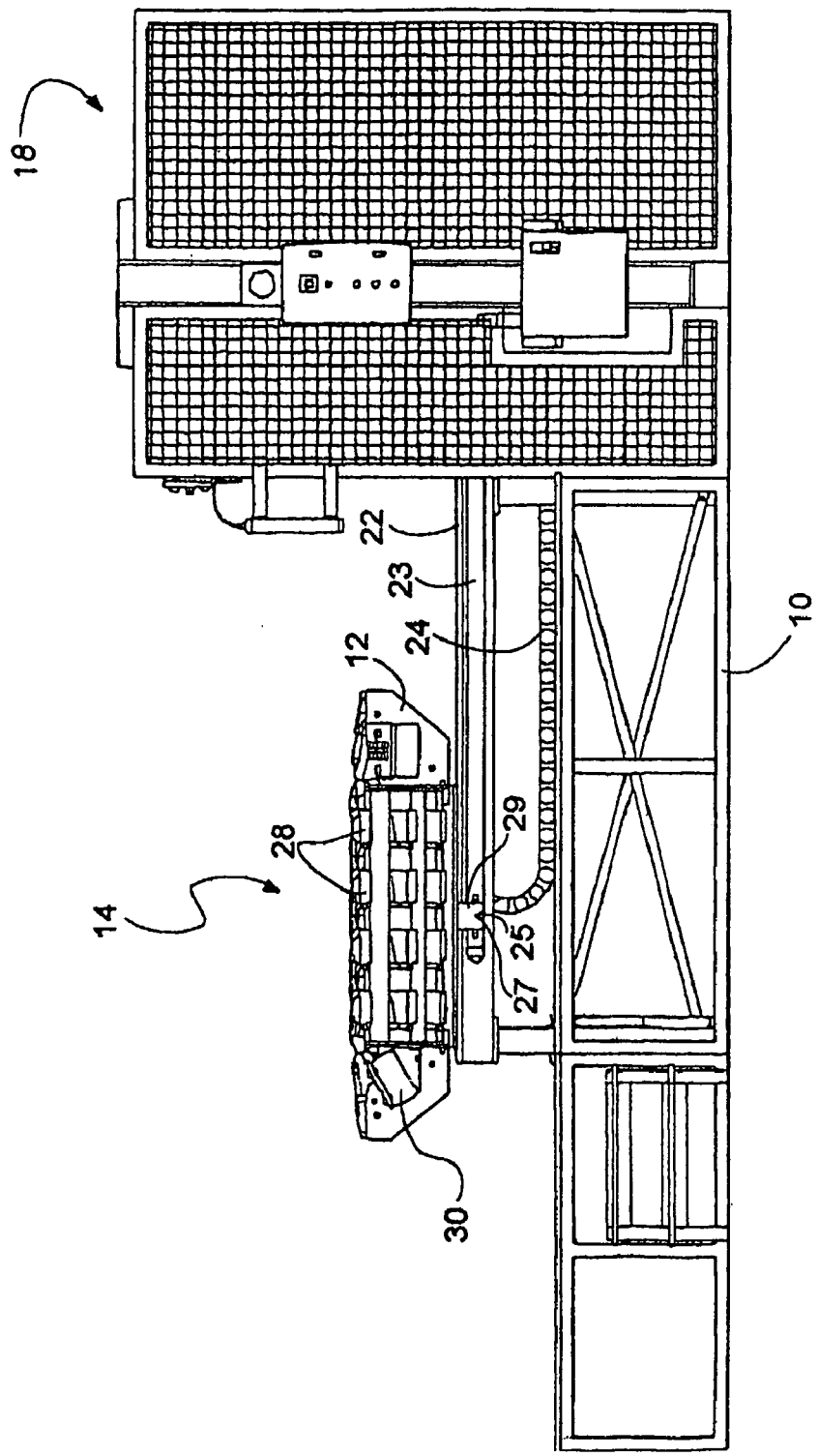
Figure 11:
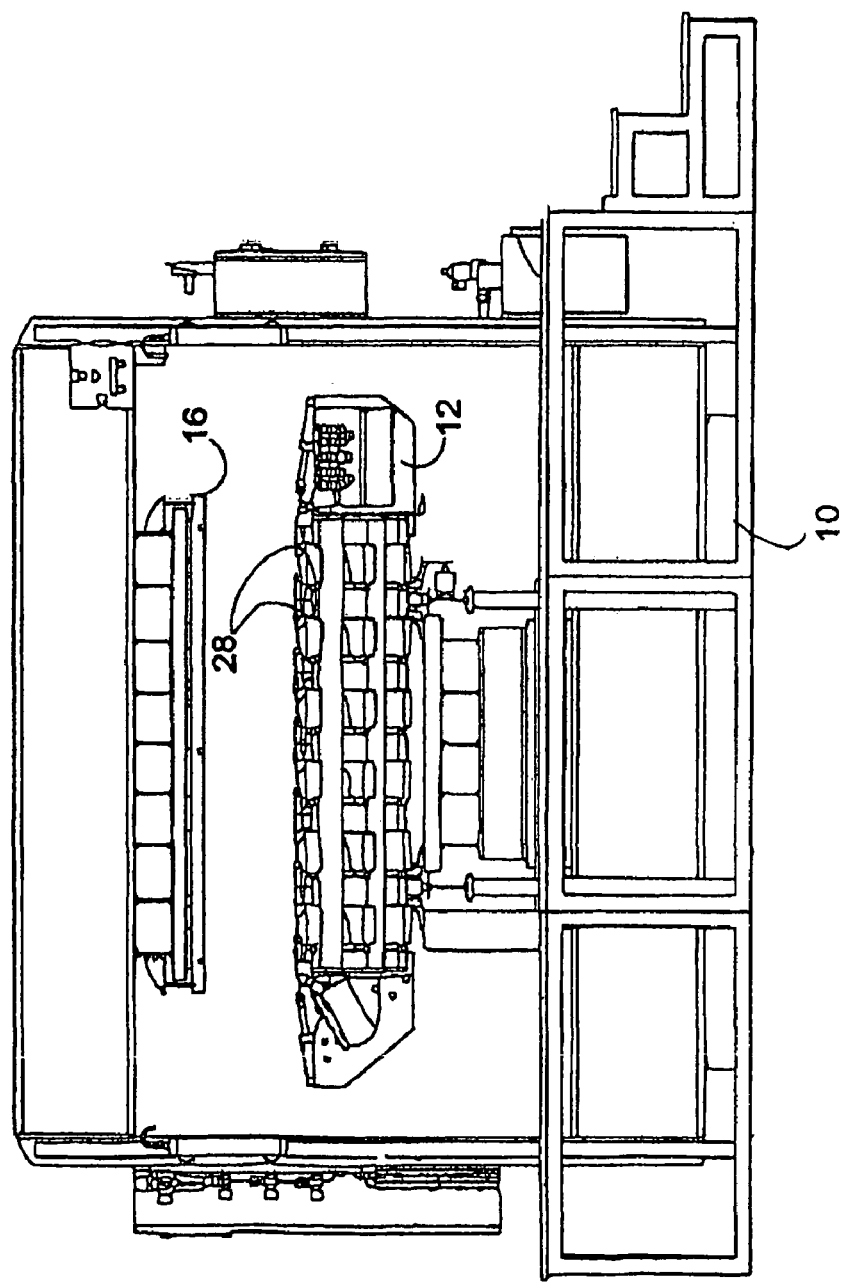

The drive includes a pin 25 which engages in a groove 27 in plate 29, which latter is secured to and extends from the cradle (see FIG. 10). The drive 23 is a Festo® linear pneumatic drive.

A flexible services umbilical cord 24 conveys electrics and pneumatics to the cradle.

Figure 3:
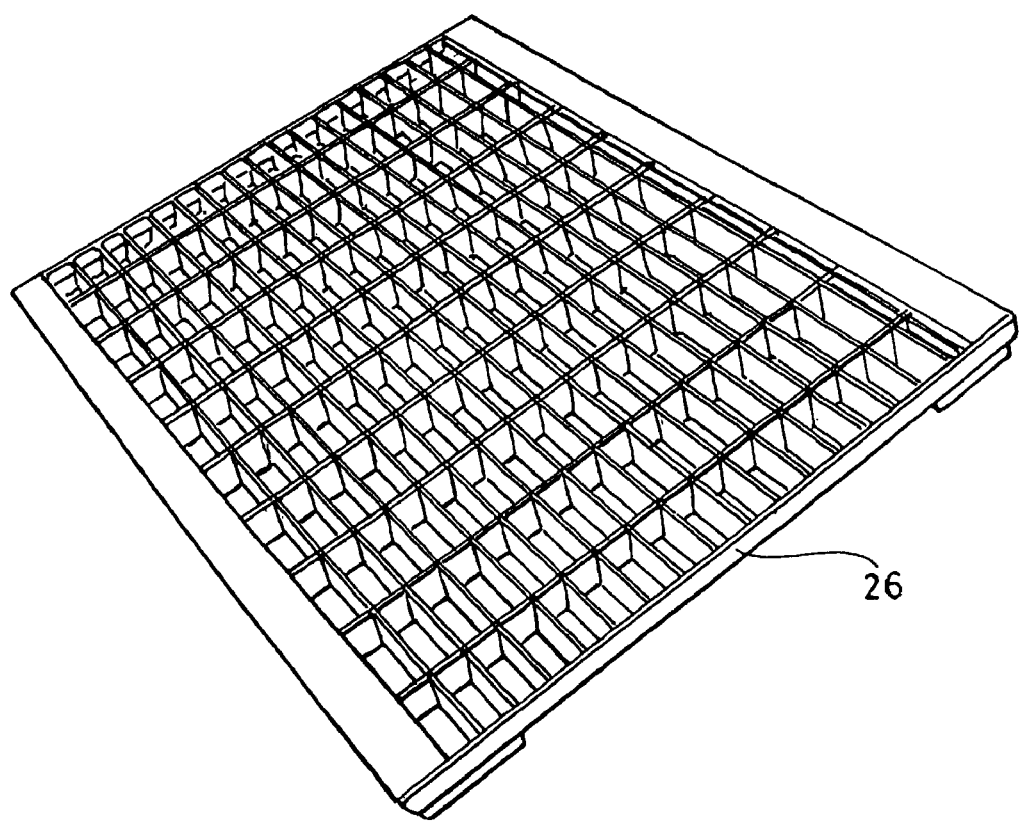
FIG. 3 is a perspective view of a wire reinforced moulded GRP frame over which woven wirecloths are to be stretched and bonded thereto to make the screen of the present invention.
Figure 4:
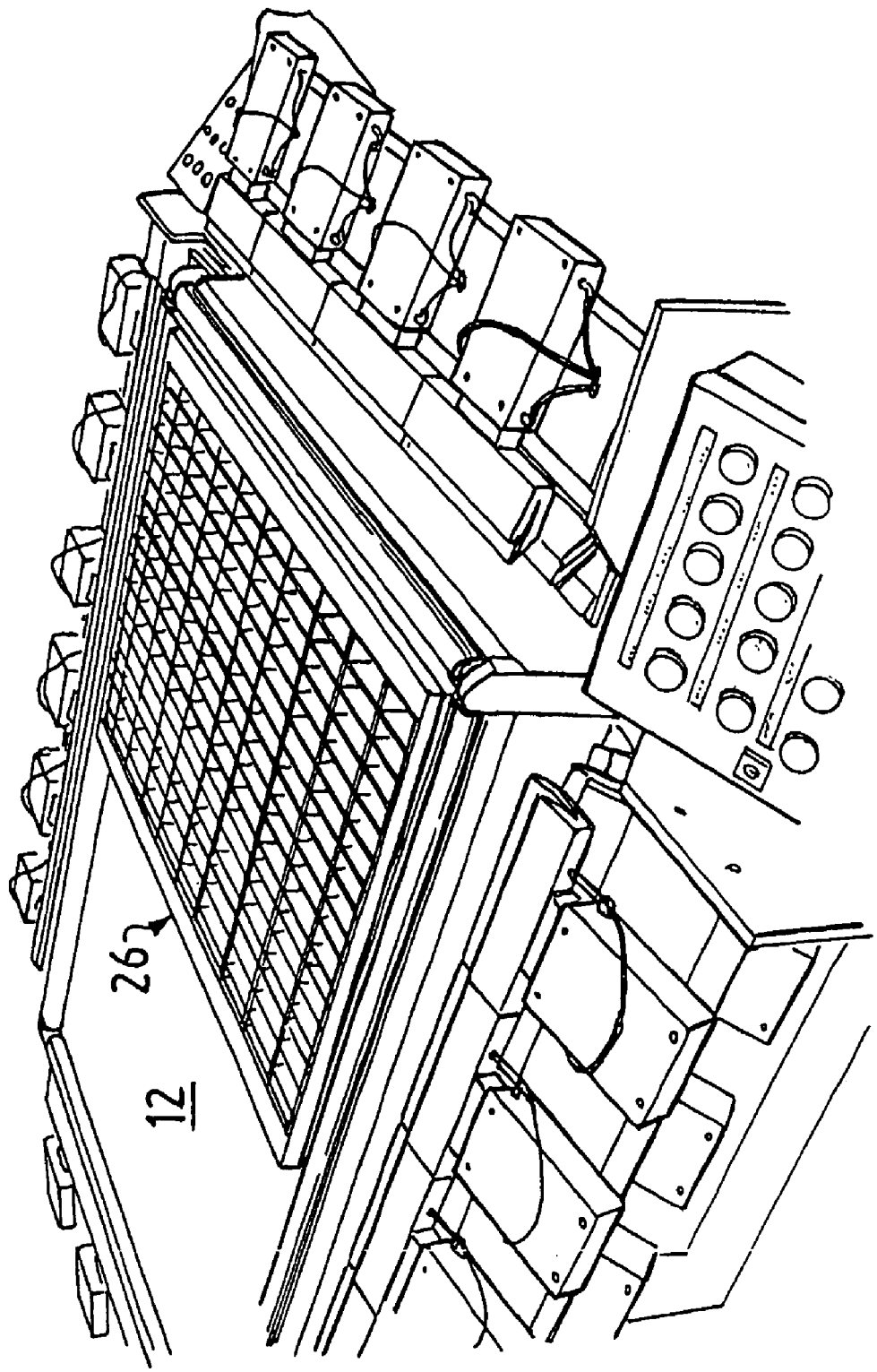
FIG. 4 is a perspective view of one corner of a jig for tensioning up to 3 layers of wirecloth over frames such as shown in FIG. 3.

At the screen assembly station, two GRP screen support frames 26, one of which is shown in FIG. 3, are laid side by side in the jig cradle 12. FIG. 4 shows one of the frames 26 located in the cradle 12, with the space for a second frame 26 beside it. The plan view of the apparatus (FIG. 12) also shows one frame located in the jig. Each frame 26 comprises a rectilinear grid of orthogonally intersecting, wire reinforced glass fibre reinforced polypropylene bars as described in Patent Specifications WO95/23655 and WO98/37988. In known manner, the upper surfaces of the peripheral edges and intersecting bars of the frame are moulded with upstanding ridges.

Having located the two frames in the jig woven wire filter cloths are laid in turn over the frames, and the edges of each cloth inserted into and gripped by pneumatic clamp units 28 carried by the jig before the next cloth is applied. The pneumatic clamp units are shown in more detail in FIG. 7. The warps and wefts of the cloths define rectangular openings and the cloths are laid over the frames with the longer dimensions of the rectangular openings in the cloth parallel to the longer edges of each frame.

Each clamp comprises fixed upper and lower jaws 28A, 28B the lower of which carries on its upwardly facing surface an inflatable envelope 28C over which, lies a protective aluminium plate 28D. A cloth edge is inserted between 28D and a rubber strip 28E on the underside surface of the upper jaw, so that when 28C is inflated the cloth is clamped between plate 28D and the upper jaw, the rubber strip 28E reducing the risk of slip occurring when the cloth is tensioned. In use, the edge of a wire cloth is pulled over the breaker bar 31 and inserted between the jaws 28A, 28B between the rubber strip and the aluminium plate. The envelope is then inflated to grip the cloth between the rubber strip and the plate with a pressure sufficient to withstand the tensioning forces subsequently to be applied to the cloth.

Figure 14:
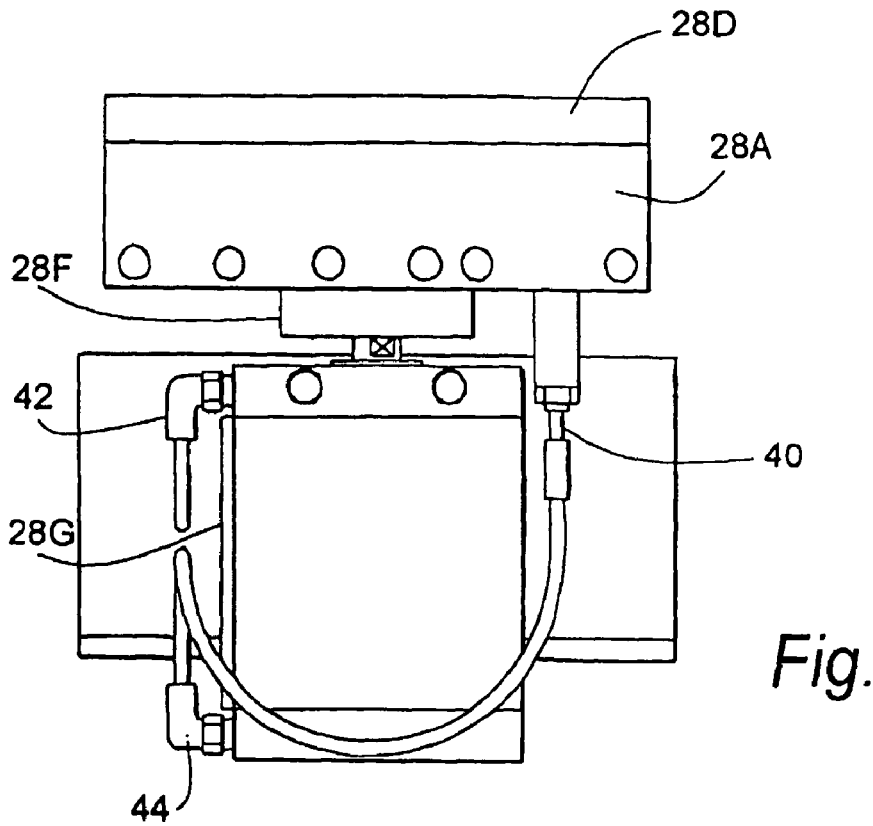
FIGS. 14-18 are schematic diagrams of the controls and devices for gripping and tensioning the cloths.
Figure 14A:
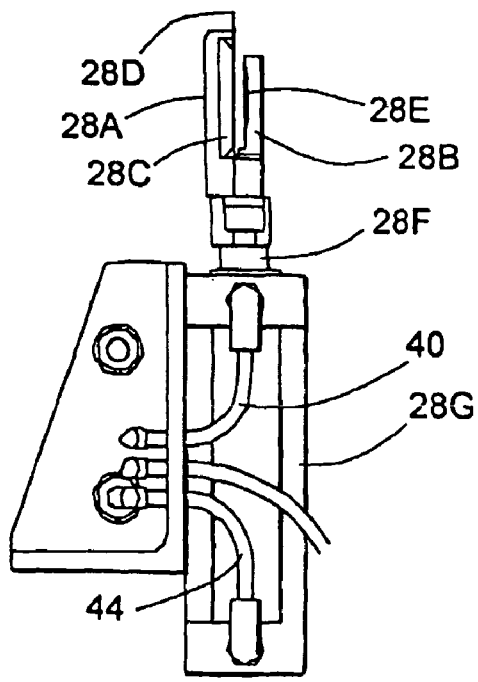

As best seen in FIGS. 14A and 14B the rear edge of each aluminium plate 28D is upturned to form a lip which engages in a groove in the underside of the upper jaw 28A near the rear edge thereof.

Figure 13A:
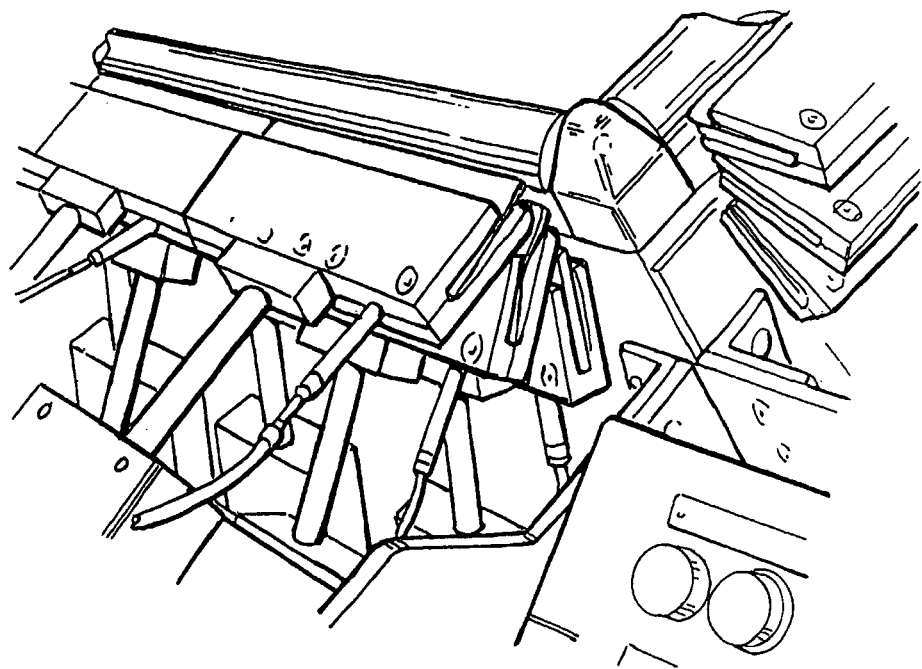
FIGS. 13A and 13B show the clamping and tensioning devices advanced (in 13A) ready to receive the edges of the cloths and fully retracted (in 13B), retraction serving to tension the cloths gripped between the jaws of the devices.

In order to enable cloth tensioning, jaws 28A, 28B are joined at their rear to form a single assembly carried by the piston 28F of a double acting pneumatic cylinder 28G. The double acting pneumatic cylinder and piston 28G, 28F constitute a tensioning device and there is one such device for each clamp unit. Supplying air to the forward end of the cylinder 28G forces the piston rearwardly, and thereby the jaw assembly, back away from the jig to stretch the gripped cloth over a breaker bar 32 (see FIG. 6) at the periphery of the jig. Supplying air to the rear end of the cylinder moves the jaw assembly forward to its rest position nearer the jig as shown in FIG. 13A. This is effected after the cloth has been bonded to the frame and the jaws released, as later described. The breaker bar 32 prevents any local rippling of the wire cloth during tensioning.

In practice, it will be understood that all four edges of a wire cloth are gripped prior to tensioning, as will be clear from later description.

The pneumatic supply for the clamp units is later described with reference to FIGS. 14 and 14A.

Three layers of clamp units 28 are provided, to allow up to three cloths to be laid over and secured to the frames.

Figure 13B:
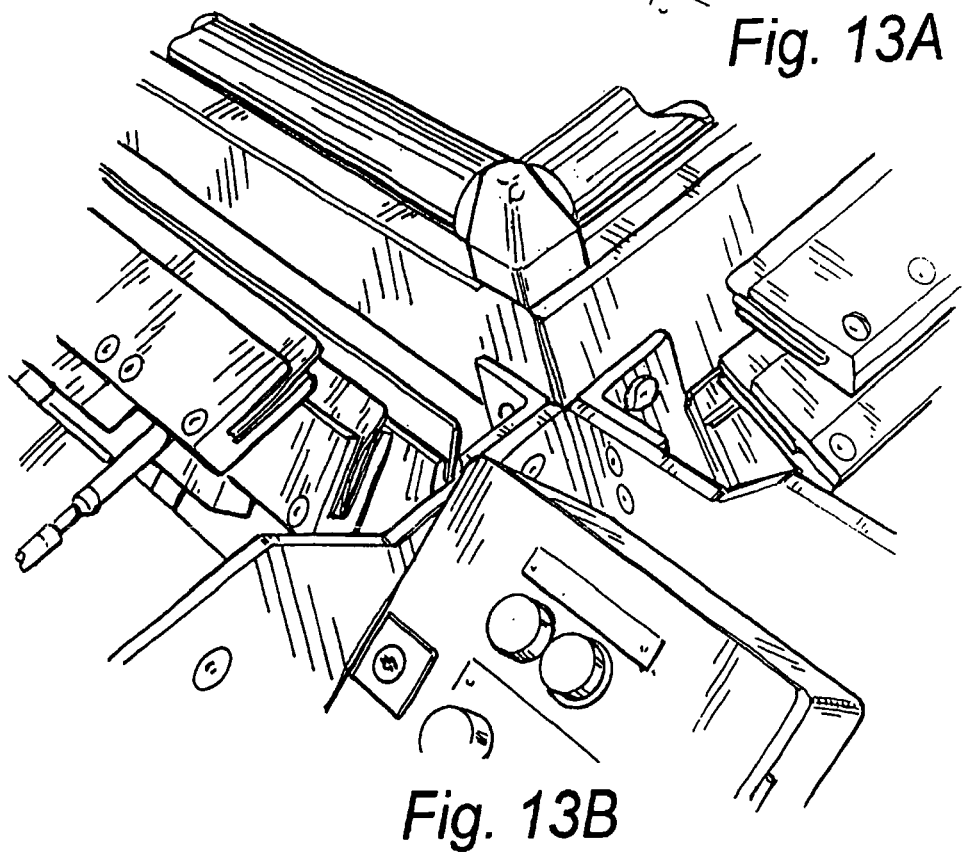

Three lines of clamp units 28 (such as can be seen in FIGS. 6, 13A and 13B) are provided on all four sides of the cradle, and a master control panel 30 (see FIGS. 6 and 12) is provided at one corner, and three slave control panels 30A, 30B and 30C are located at the other corners, so that an operator can control the clamps and tensioning devices along successive sides of the cradle individually, by simply moving from one side to the next therearound.

Having gripped all four edges of a wire mesh cloth between the clamp unit jaws, the latter are pneumatically driven outwardly of the jig by means of the aforesaid cylinder and piston devices, in order to tension the cloth over the two frames. Each tensioning device, constituted by the aforesaid double acting pneumatic cylinder and piston, is operable independently, to stretch the cloth over the breaker bars 32 extending along the four edges of the jig cradle, whereby to ensure that the cloth is uniformly tensioned without ripples or creases.

The process is repeated for each cloth, a first coarse mesh cloth being located between the jaws of the lowest line of clamps 28, a finer mesh cloth in the next line of clamps, and another fine mesh cloth in the third line of clamps, the mesh size of the two fine mesh cloths being similar but not identical.

Figure 5:
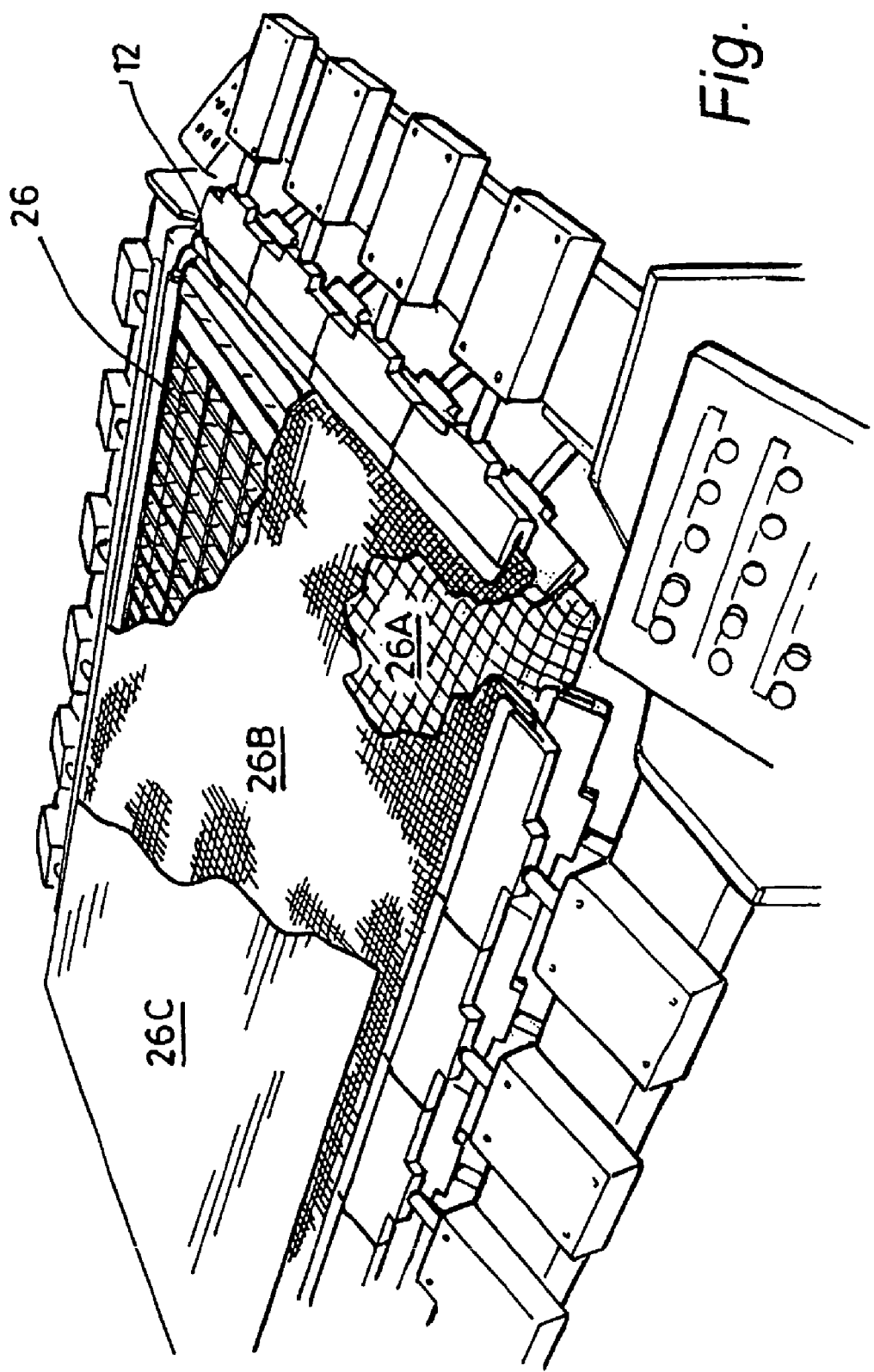
FIG. 5 is a similar view to that of FIG. 4 in which a coarse mesh cloth has been laid over the frame and tensioned and thereafter a fine mesh cloth has been similarly laid over the first and tensioned, each cloth being of the type shown in FIG. 1.
Figure 9:
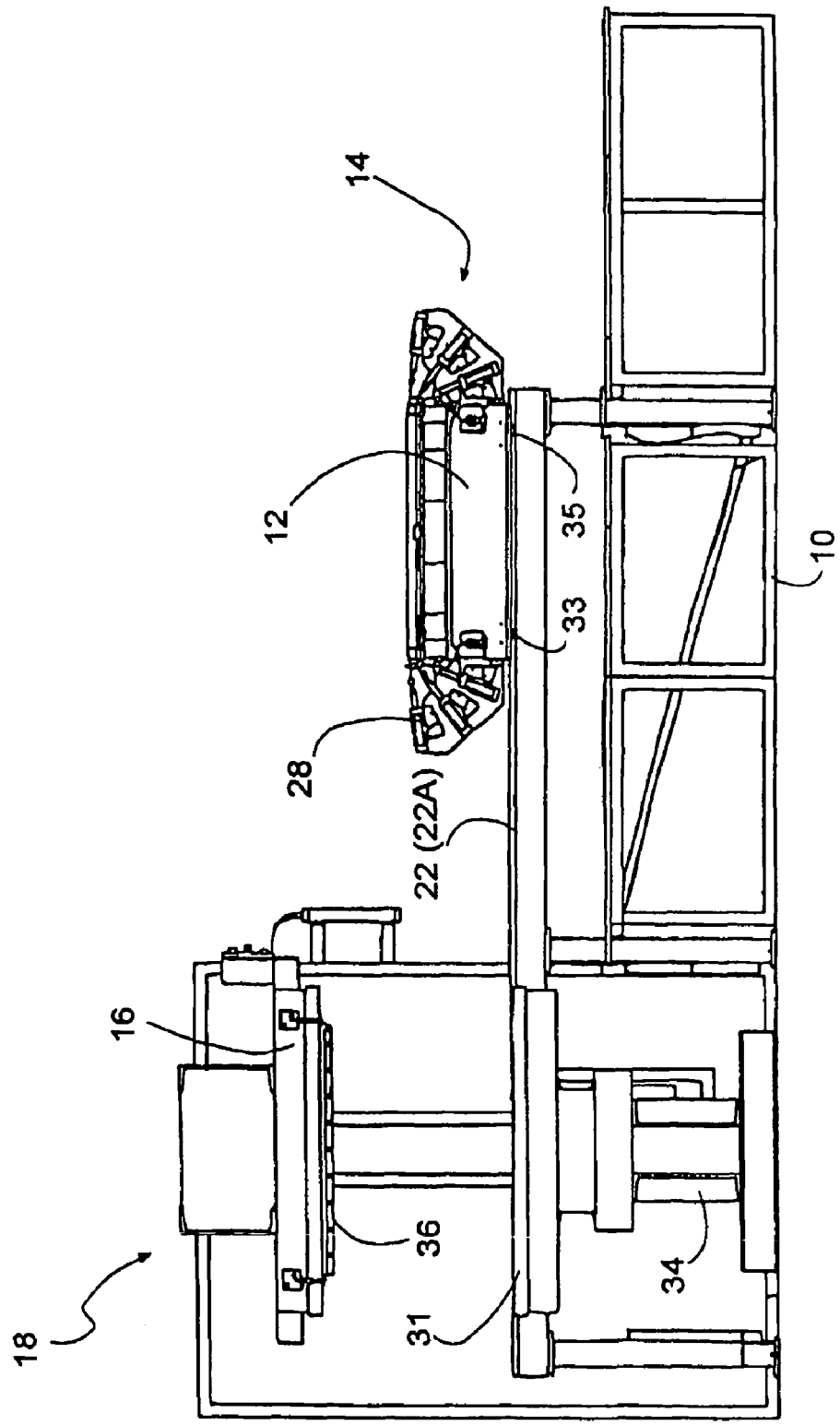

The complete cradle can then be moved to the bonding station, under the heating platen on the unit 16, best seen in FIGS. 9 and 12. First, however, before bonding, in order to prevent direct contact between the upper screen cloth and the heating platen, a heat resistant non-stick fabric, e.g. PTFE glass fabric, is laid over the tensioned cloth in the jig cradle. If desired the edges can be gripped by a line of clamp units. FIG. 5 shows the jig 12 with the two frames 26 located therein, upper and lower wire mesh cloths 26A and 26B cut away in part, stretched over the frame, and the release fabric 26C, also cut away in part, laid over the cloths.

At the bonding station, the jig is raised and lowered by a platform 31 acted on by a hydraulic ram 34, the platform 31 engaging the underside of the jig 12 to lift it, and in so doing lifting the wheels 33, 35 off the rails 22, 22A. On being raised the cloth on the screens is brought into contact with the platen 36, which is pre-heated by an electric heating element (not shown).

The heated platen softens the ridges on the upper edges of the interstices and the side flanges of the plastics frames, and the warp and weft wires of the tensioned cloths are pressed into the softened material. The ridging of the side flanges, and interstices aids the bonding process, as described in the aforementioned published International Patent Specification No. WO 98/37988.

After bonding the screen assembly is then lowered and moved back to the assembly station.

Back at the assembly station, the PTFE release fabric is stripped off, the tension on the cloths is released, the screen cloths are cut between the two frames, each frame is removed from the jig, and the protruding edges of the wirelolth are trimmed back to the edges of the frames by for example using an angle grinder. Manufacture of the screens is then complete, and the jig is now ready to receive the next two frames and layers of cloth to make the next two screens. The bonding of the cloths to the interstices as well as to the edges of each frame serves to maintain the shape and length to width ratios of the warp and weft defining openings in the cloths.

For completeness, FIGS. 14 and 14A show the air supply lines to the clamp units. Air for inflating the envelope 28C in the jaws 28A, 28B is supplied through air line 40. Complete evacuation of the envelope is required fully to open the space between the jaws prior to insertion of the edges of a fresh wire mesh cloth and this is achieved by applying vacuum to line 40.

Air for operation of the double acting cylinder 28G is supplied through air lines 42, 44. Supplying air through line 42 drives the piston 28F, and thus the clamp, outwardly of the jig in order to tension a wire mesh cloth clamped between the jaws. Supplying air through line 44 drives the clamp back towards the jig at the end of the operational sequence, so that the clamps are back in the positions shown in FIG. 13A ready to receive the next screen cloths for bonding to the next pair of frames.

Figure 15:
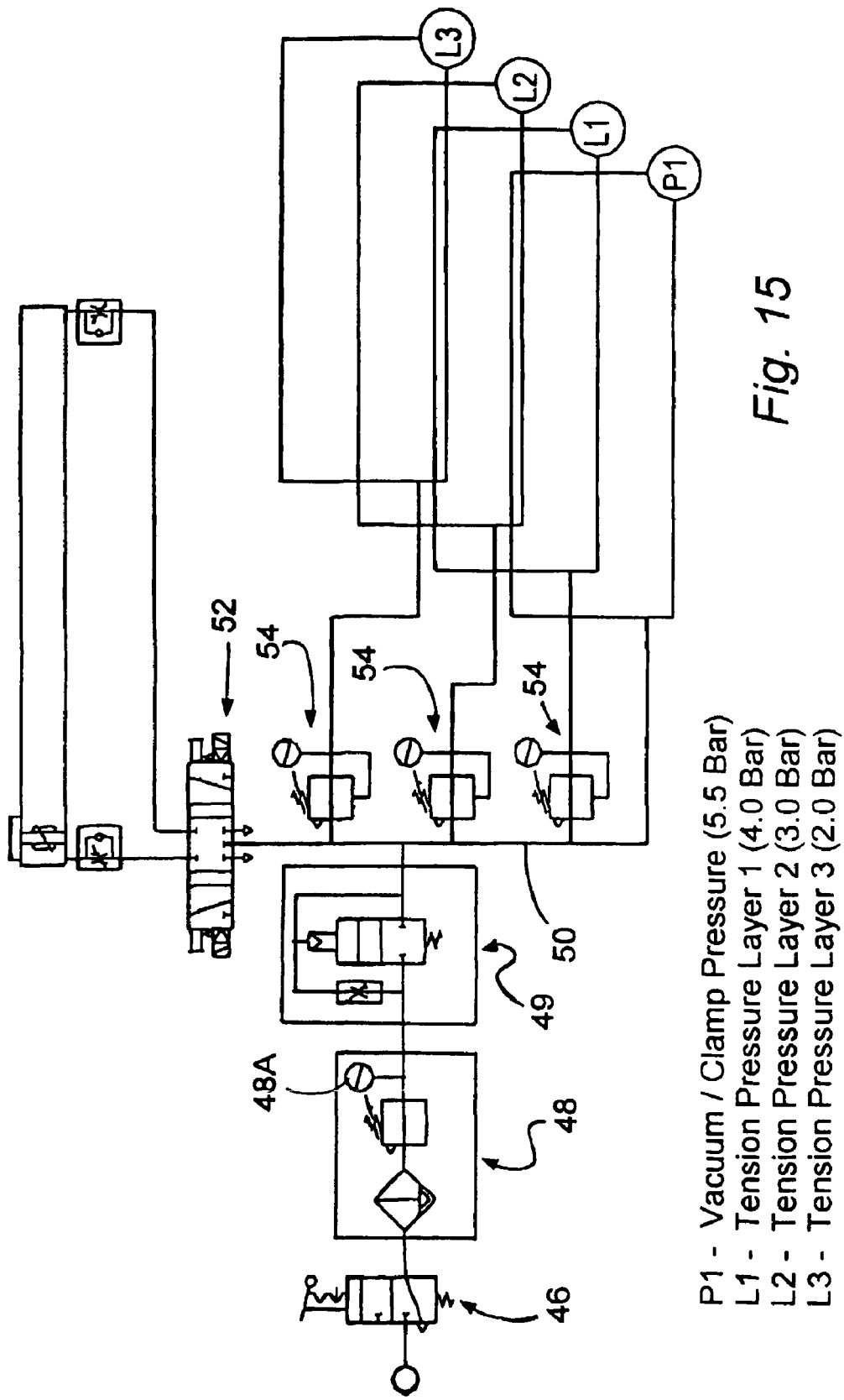

The pneumatic control circuit for the clamps and tensioning devices is shown in FIG. 15.

Air under pressure is supplied via an on/off valve 46 to a pressure adjustable valve 48 and associated pressure meter 48A and thence through a filter and valve unit 49 to a pressure line 50 from which air can be supplied via a pneumatic switching circuit 52 to operate the clamps and tensioning devices. The switching circuit is controlled by buttons on the control panels at the corners of the jog, those buttons being respectively labelled L3, L2, L1 and P1 in the drawing. Each line pressure for the clamp and tensioning devices is adjustable by means of pressure adjusters and associated meters 54. A typical line pressure P1 for operating the clamps may be 5.5 bar, and typical tensioning pressures may be 4.8 bar (L3) for the uppermost layer of tensioning devices, 3.0 bar (L2) for the intermediate layer and 2.0 bar (L1) for the bottom layer. There may, of course, be only one or two wire mesh cloths applied in the manufacture of any particular screen, in which case some of the buttons for the unused layers of tensioning devices will not be operated. The exemplary line pressures mentioned for the tensioning devices are given assuming all three layers of tensioning devices are to be used. The valves employed in the pneumatic control circuit are all solenoid valves.

Figure 16:
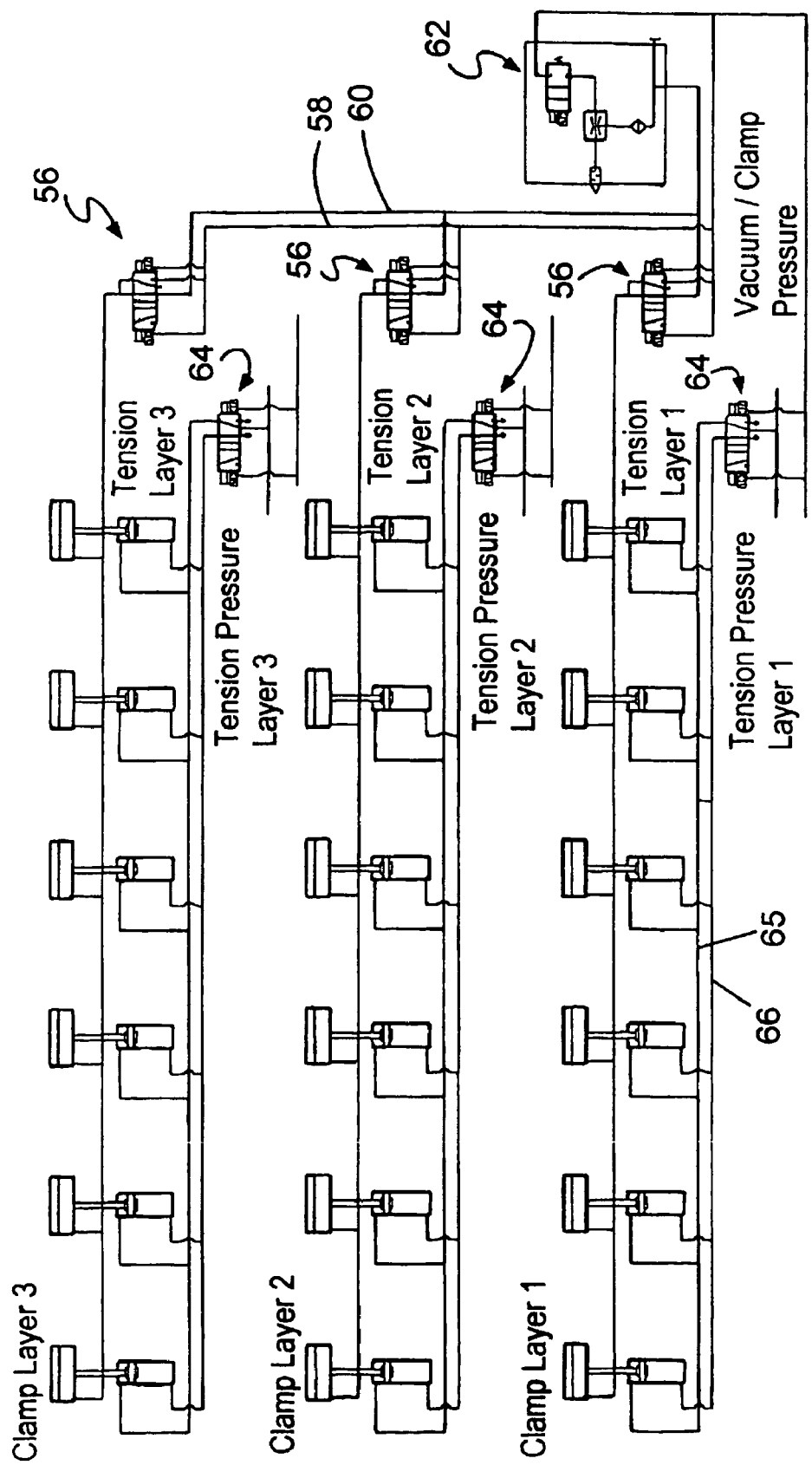
Figure 17:
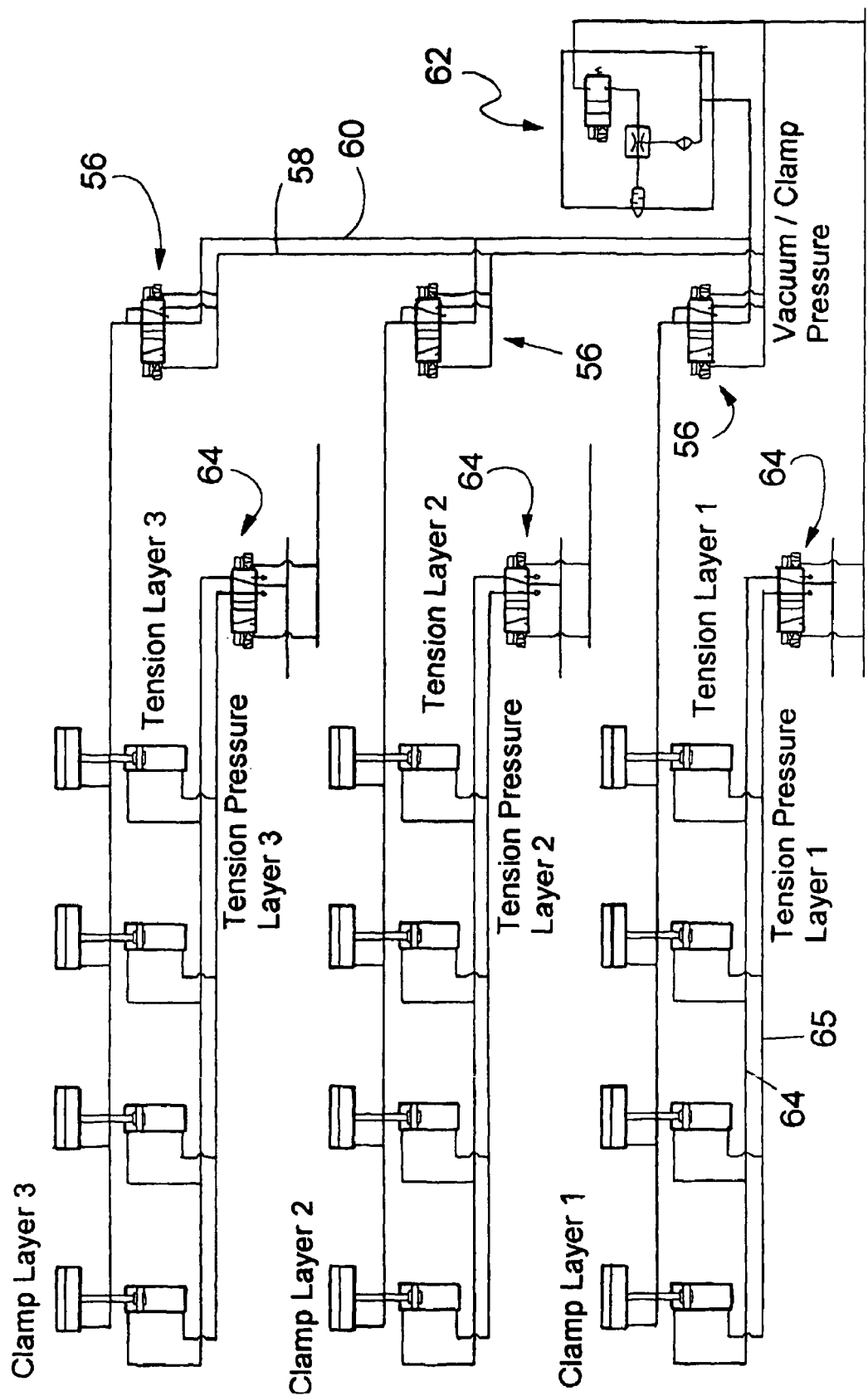

FIGS. 16 and 17 show the set up of the pneumatics for the clamp units. First, it has to be understood that the frames to which the wire mesh cloths are to be bonded are rectangular, with two shorter sides A and B and two longer sides C and D. The two frames are located in the jig with their shorter sides A and B in line, thus requiring six clamp units along each of the aligned edges, (twelve in all) for a cloth laid over both frames. Four clamp units are provided along each longer side of the frames at opposite ends of the jig (eight in all).

FIG. 16 shows the set up for six clamp units along one side of the jig; this set up is repeated for the other side.

FIG. 17 shows the set up for the four clamp units along the longer ends of the jig. The set up of FIG. 17 is also repeated at the opposite end. In both figures, the set up is shown for the clamp units in all three layers.

In both of FIGS. 16 and 17 switching valves 56 control the inflation and collapse of the envelopes in the clamps through lines 58 and 60. Venting the envelopes to atmosphere via 60 releases the cloths to allow their edges to be removed. Applying vacuum to 60 by using 62, collapses the envelopes to facilitate the insertion of new cloth between the clamping jaws. Valve units 64 control the supply of air to the pneumatic cylinder tensioning devices through lines, 65, 66, the line 65 for tensioning and the line 66 for untensioning.

Figure 18:
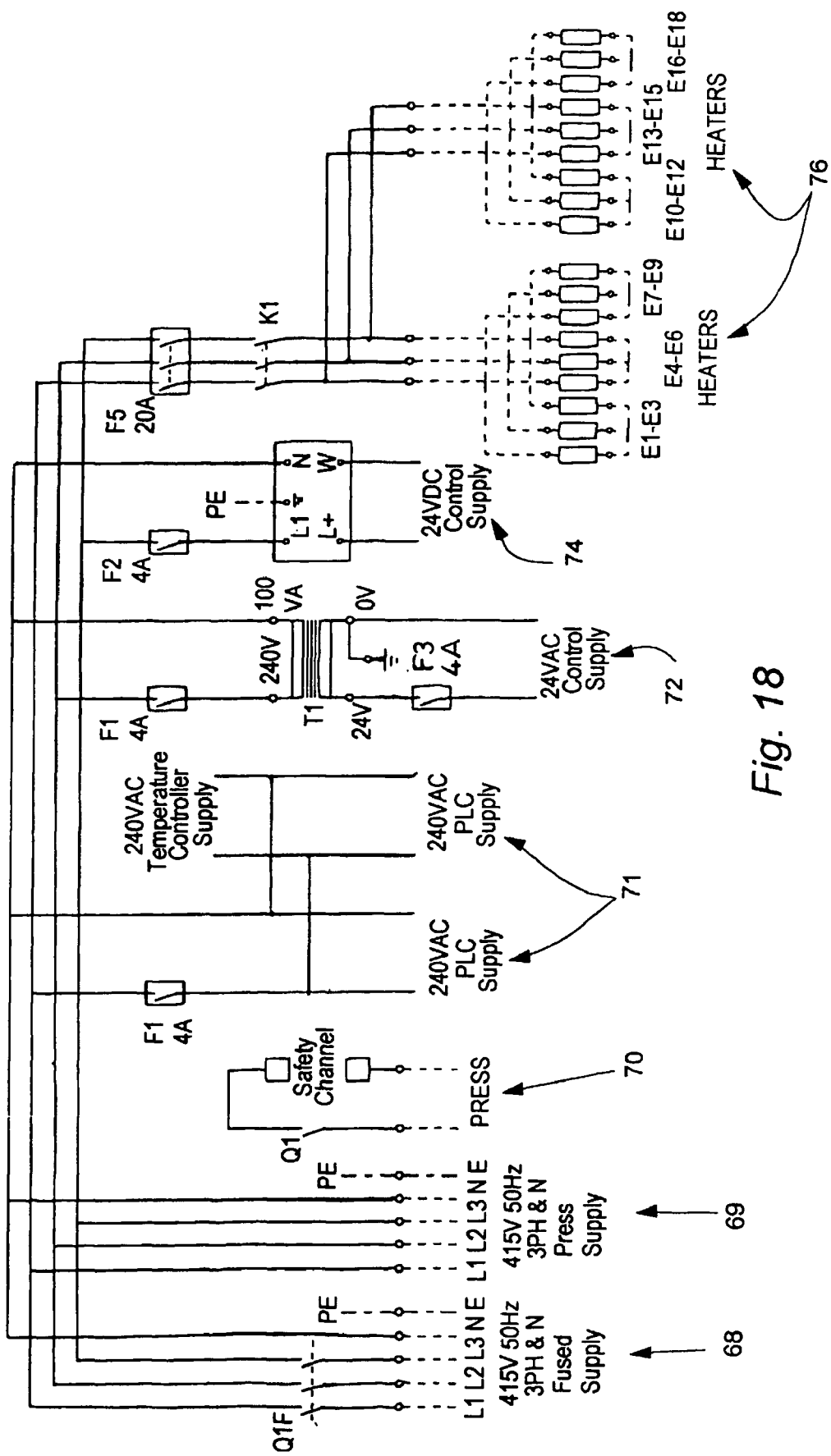

In FIG. 18 reference 68 indicates the fused electrical power input terminals; reference 69 indicates the power supply to the motor driving an oil pump for supplying hydraulic oil under pressure to the ram which lifts and lowers the cradle at the bonding station; reference 70 indicates the power supply to a photoelectric safety circuit which is provided to stop and reverse the hydraulic drive if a light beam in the path of the cradle across the entrance to the bonding station is interrupted for any reason while the cradle is being lifted towards the heating platen; reference 71 indicates the power supply enabling computer control of the sequence of the operating procedure of the apparatus; reference 72 indicates the power supply for all AC solenoid valves employed in the pneumatic circuits and reference 74 is the power supply for all DC solenoid valves, and reference 76 indicates the power supply to the heater used in heating the platen at the bonding station.

Figure 19:
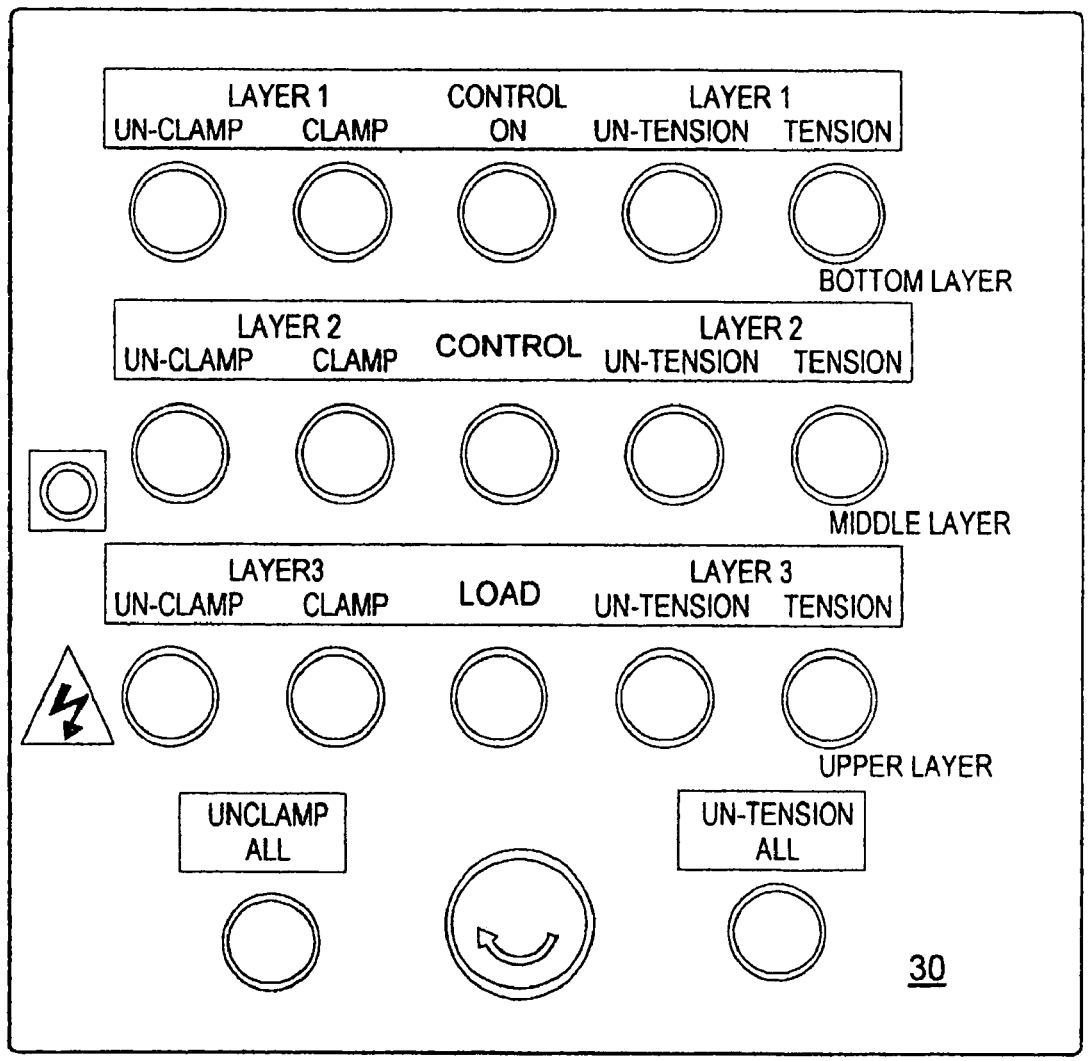
FIGS. 19 and 19A show the control panels to an enlarged scale.
Figure 19A:
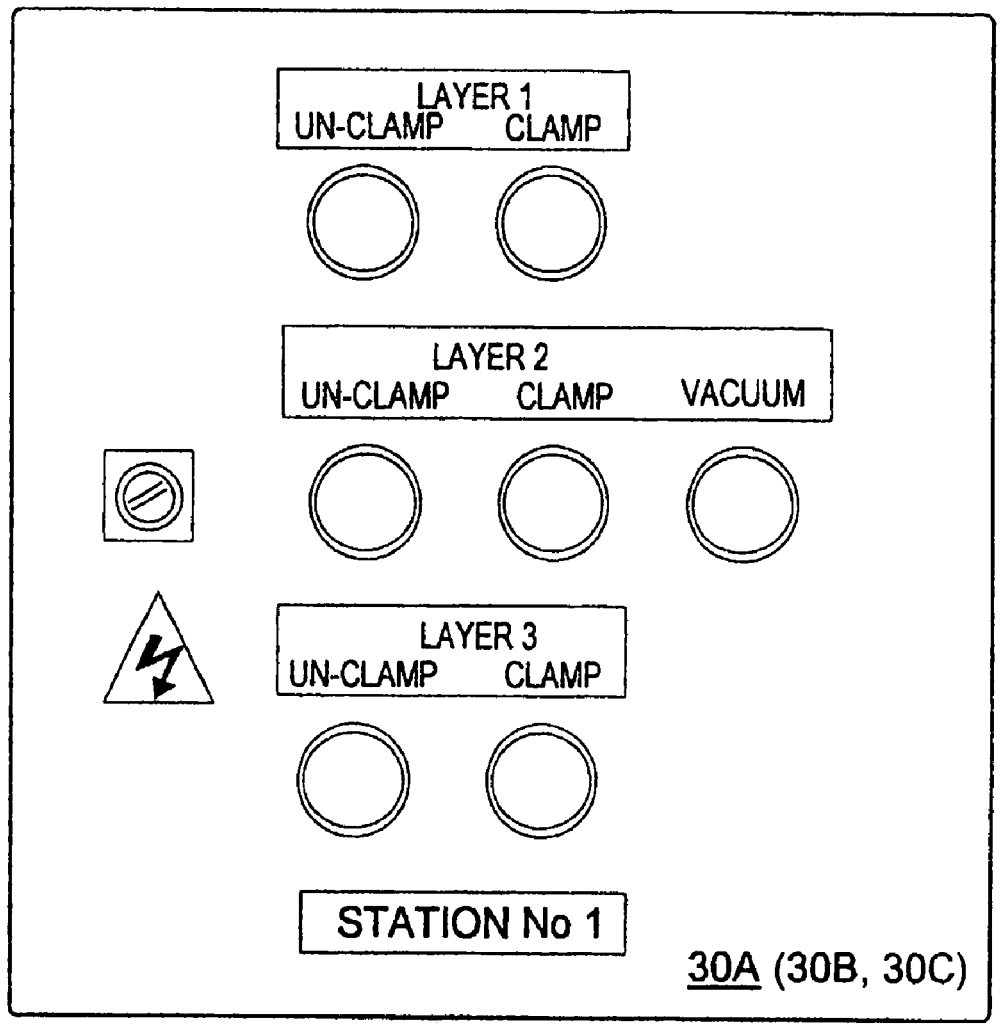

Finally FIGS. 19 and 19A respectively show the master control panel 30 at one corner of the jig, and one of the secondary (or slave) control panels 30A, 30B, 30C at one of the other corners of the jig. The buttons are marked with their functions.

The main panel 30 and each secondary panel 30A, 30B, 30C provides for clamping, unclamping and evacuation of the clamp envelops, along the first, second, third and fourth sides of the jig respectively, if appropriate for all three layers of cloth.

The main control panel 30 additionally provides for tensioning and untensioning along all four sides of the jig, including the first side, which is where the operator starts the loading of the jig. Thus, the operator, having first located the edge of a cloth in the clamps along the first side of the jig, uses the main control panel 30 to operate those clamps to clamp that edge, and then moves round the jig to clamp the edges of the cloth in sequence on the second, third and fourth sides. This brings the operator back to the main control panel, at which the appropriate tensioning button can be pressed to operate all the pneumatic cylinder tensioning devices simultaneously so all the clamps for one layer are moved outwardly at the same time, thus tensioning the cloth appertaining to that layer.

When loading has been completed and the cradle moved back to the assembly station, the operator can use the main control panel 30 first to apply pressure to reverse all the tensioning pneumatic cylinders of all the cloth layers.

All the clamping can be released by evacuating all the inflated envelopes to atmosphere, and the latter can be flattened to assist in inserting more wire cloth edges, by applying vacuum to all the envelopes.

It is important to note that, during tensioning, the same air pressure is applied to the pistons of the pneumatic tensioning devices and these may not all move exactly equally, but each will move to the extent necessary to tension all parts of the relevant cloth to the predetermined and preset extent.

The invention claimed is:

1. A screen for use in a vibrating machine for separating particulate material from liquid material comprising:
   a) a rigid rectangular support frame of metal coated with plastics material or reinforced plastics material;
   b) an array of orthogonal rigid interstices made of metal coated with plastics material or reinforced plastics material and mounted in the frame to define a plurality of similar sized rectangular openings;
   c) an uncalendered wire cloth having a greater number of warp wires than welt wires per given area, so as to define a plurality of rectangular apertures each having a length to width ratio of between approximately 2.7 to 2.8, the ratio of the length to the diameter of the wire being approximately 5.5 to 5.7;
   d) said uncalendered wire cloth embedded in said plastics material of said frame and said interstices so as to be under tension in both warp and weft directions.

2. The screen as claimed in claim 1, wherein at least two wire uncalendered cloths each as aforesaid are stretched over the frame and bonded to the interstices within the frame, so as to form a multilayer cloth layer screen.

3. The screen as claimed in claim 2, wherein the mesh size of one of the cloths is different from that of the other.

4. The screen as claimed in claim 3, wherein a cloth having a smaller mesh size overlays a coarser mesh cloth, both cloths being tensioned and bonded to the frame and interstices.

* * * * *